United States Patent
Nabernegg

(10) Patent No.: US 9,872,371 B2
(45) Date of Patent: Jan. 16, 2018

(54) TANK

(71) Applicant: MAGNA STEYR Fuel Systems GesmbH, Sinabelkirchen (AT)

(72) Inventor: Karl Nabernegg, Sebersdorf (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 265 days.

(21) Appl. No.: 14/515,775

(22) Filed: Oct. 16, 2014

(65) Prior Publication Data

US 2015/0103463 A1    Apr. 16, 2015

(30) Foreign Application Priority Data

Oct. 16, 2013  (EP) ..................................... 13188994

(51) Int. Cl.

| | | |
|---|---|---|
| H05F 3/02 | (2006.01) | |
| B60K 15/03 | (2006.01) | |
| F02M 37/10 | (2006.01) | |
| F02D 33/00 | (2006.01) | |
| F02M 37/08 | (2006.01) | |

(52) U.S. Cl.
CPC ............... H05F 3/02 (2013.01); B60K 15/03 (2013.01); F02D 33/003 (2013.01); F02M 37/103 (2013.01); B60K 2015/03243 (2013.01); B60K 2015/03401 (2013.01); F02M 2037/082 (2013.01)

(58) Field of Classification Search
CPC ......... F02D 33/003; H05F 3/02; B60K 15/03; B60K 2015/03243; B60K 2015/03401; F02M 37/103; F02M 2037/082

USPC ......................................................... 361/215

See application file for complete search history.

(56) References Cited

U.S. PATENT DOCUMENTS

| | | | |
|---|---|---|---|
| 6,206,035 B1 | 3/2001 | Wehner et al. | |
| 6,679,227 B2 | 1/2004 | Sawert et al. | |
| 2003/0084884 A1 | 5/2003 | Sawert et al. | |
| 2004/0065144 A1 | 4/2004 | Mitani et al. | |
| 2004/0231730 A1* | 11/2004 | Nakamura | B60K 15/03 137/565.16 |
| 2006/0219318 A1 | 10/2006 | Crary | |
| 2014/0198425 A1* | 7/2014 | Beyer | B60R 16/06 361/215 |

FOREIGN PATENT DOCUMENTS

CN    1880128 A    12/2006

OTHER PUBLICATIONS

Zhang Yuchun; Office Action and Search Report for Chinese Patent Application No. 20141052659838, dated Jun. 23, 2016, 11 pages including 7 pages of English translation.

* cited by examiner

*Primary Examiner* — Thienvu Tran
*Assistant Examiner* — Kevin J Comber
(74) *Attorney, Agent, or Firm* — Jordan IP Law, LLC; Todd A. Vaughn

(57) ABSTRACT

A tank which has at least one at least partially electrically conductive container, an electric component arranged in the fuel tank, and a cover to close an opening for the electric component, the tank allowing grounding in a simple manner.

6 Claims, 3 Drawing Sheets

PRIOR ART

TANK

CROSS-REFERENCE TO RELATED APPLICATIONS

The present application claims priority 35 U.S.C. § 119 to European Patent Publication No. EP 13188994.1 (filed on Oct. 16, 2013), which is hereby incorporated by reference in its entirety.

TECHNICAL FIELD

Embodiments relate to a tank, more specifically a fuel tank, such as, for example, a fuel tank for a motor vehicle. Such a tank may include at least one at least partially electrically conductive container, an electric built-in component, which is arranged within the tank, and a cover to close an opening for the electric component.

BACKGROUND

In tank systems, there is a requirement to provide grounding of the tank to carry away or prevent a possible static charge in the vehicle. In the case of steel tanks, this grounding is usually achieved either externally by attaching bolts with nuts and/or lugs to the tank. The bolts and/or lugs may be connected to the ground with the aid of an grounding strip, or internally using bolts and/or lugs and an grounding strip which is connected to the ground of an electric built-in component, e.g., a delivery module.

Welding bolts and/or lugs and installing the grounding strip as well as making enquiries to ensure that installation has been carried out leads to increased costs. In the case of a service, there is the risk that a lack of grounding will arise in the absence of a connection with the ground line.

A known fuel supply system with grounding is disclosed in German Patent Publication No. DE 10 2007 021 584 A1. As illustrated in FIG. 1, the known fuel supply system comprises a cover 3, which is mounted on the upper surface of a fuel tank 1 in order to close an opening 4 formed in the upper wall. The cover 3 is produced from a plastic and comprises a tubular section which extends into the interior of the fuel tank container 11. A pump housing 16 is mounted on the lower end of the tubular section. A fuel pump 2 is arranged within the pump housing 16. A control unit 18 to control a motor of the fuel pump 2 is accommodated within a recessed section. The control unit 18 comprises an ground terminal. An electrically conductive wall of the tubular section is electrically connected to the ground terminal of the control unit 18. In this prior art example too, the installation of the grounding and the insertion of the grounding spring is associated with a high outlay. Moreover, an additional, loose component is required to establish the connection between the pump and the tank.

SUMMARY

Embodiments relate to a tank having grounding which is accomplished reliably and without the additional installation of individual components.

Embodiments relate to a tank, more specifically a fuel tank, such as, for example, a fuel tank for a motor vehicle. The fuel tank may include at least one of: an at least partially electrically conductive container, an electric built-in component arranged within the fuel tank, a cover to close an opening for the electric built-in component and which includes at least one plug connection, and a grounding strip to connect an grounding pin of a plug connection to at least one conductive region of the fuel tank, wherein the opening is formed in an upper section of the fuel tank.

Via the power supply of the electric component, there is a ground connection directly to the ground body of the vehicle. By connecting the ground connection and connecting the power supply to the closure cover on the tank, a reliable and maintenance-neutral ground connection is made available.

The solution in accordance with embodiments has the advantage that the fuel tank contains a grounding strip which is moulded into the plastic of the cover. This measure reduces the number of parts since the grounding strip is moulded reliably into the cover. The risk that the ground connection will no longer exist after servicing is also minimized.

It is advantageous if the grounding strip is designed in such a way that it is partially moulded onto the surface of the cover. By this means, direct contact with the tank is established via the closure part and a reliable ground connection is made possible.

It is advantageous if the grounding strip is composed of a metal film. A metal film can easily be placed as an insert in the injection mould for the cover and then overmoulded.

It is furthermore advantageous if the grounding strip is produced from a conductive plastic. The cover can then be produced in a simple manner by a two-component injection moulding method.

It is advantageous if the fuel tank with the cover has a ground pin which establishes the ground connection to the grounding strip.

In accordance with embodiments, a tank may include at least one of: a container which is at least partially electrically conductive and which forms a tank wall; an electric built-in component arranged in the tank; a cover to close an opening formed in a section of the tank for the electric built-in component, the cover including at least one plug connection having a ground pin; and a grounding strip to connect the ground pin of to at least one conductive region of the container.

In accordance with embodiments, a vehicle fuel tank may include at least one of: a container which is at least partially electrically conductive and which forms a tank wall; a fuel pump arranged in the container; a cover to close an opening formed in a section of the tank for the fuel pump, the cover including at least one plug connection having a ground pin; a grounding strip to connect the ground pin of to at least one conductive region of the container; and a receiving ring to establish a ground connection between the grounding strip and the container.

In accordance with embodiments, a fuel tank may include at least one of: a container which is at least partially electrically conductive and which has an opening; a fuel pump arranged in the container; a cover to close an opening formed in a section of the tank for the fuel pump component, the cover including an outer flange region and a ground pin; a grounding strip to connect the ground pin of to at least one conductive region of the container, the grounding strip extending along a surface of the outer flange region; and a receiving ring to connect the cover to the container and establish a ground connection between the grounding strip and the container.

DRAWINGS

Embodiments will be illustrated by way of example in the drawings and explained in the description below.

DESCRIPTION

Figure 1:
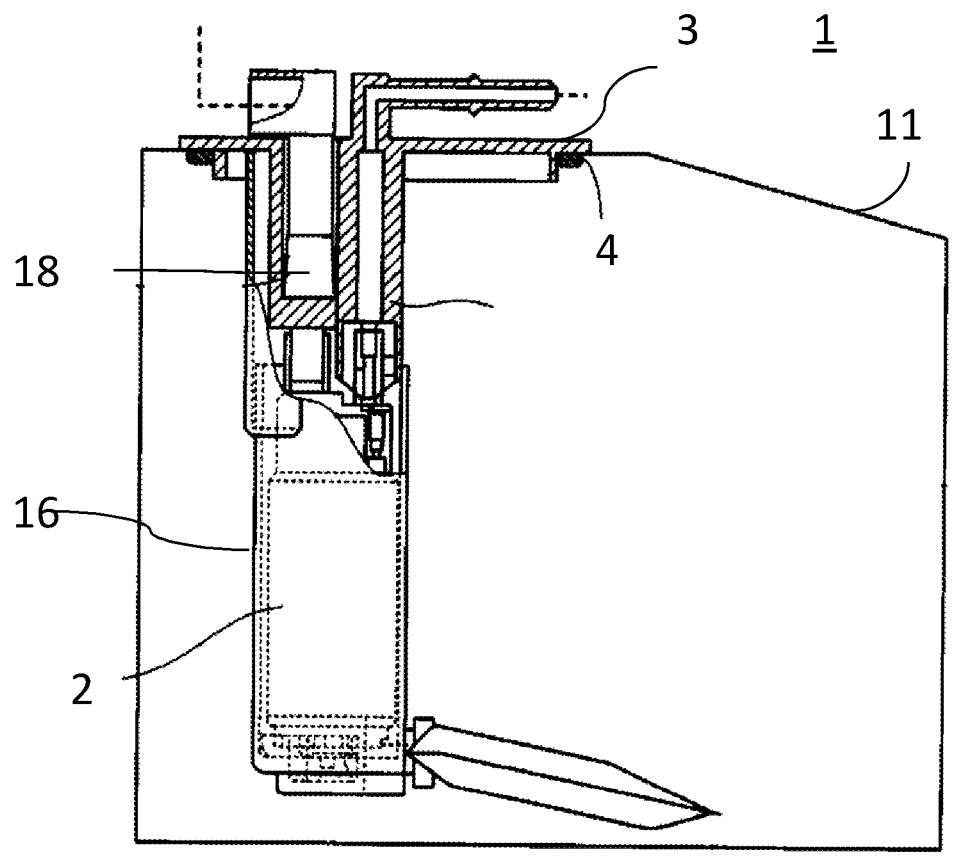
FIG. 1 illustrates a fuel tank of the prior art.
Figure 2:
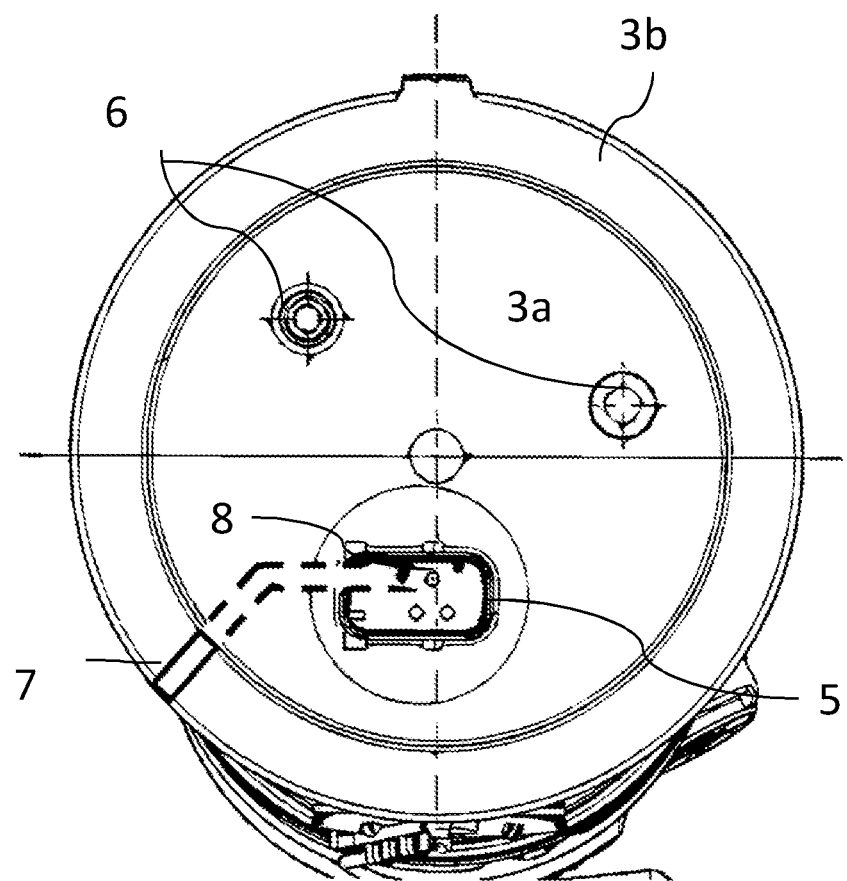
FIG. 2 illustrates a plan view of a cover in accordance with embodiments.
Figure 3:
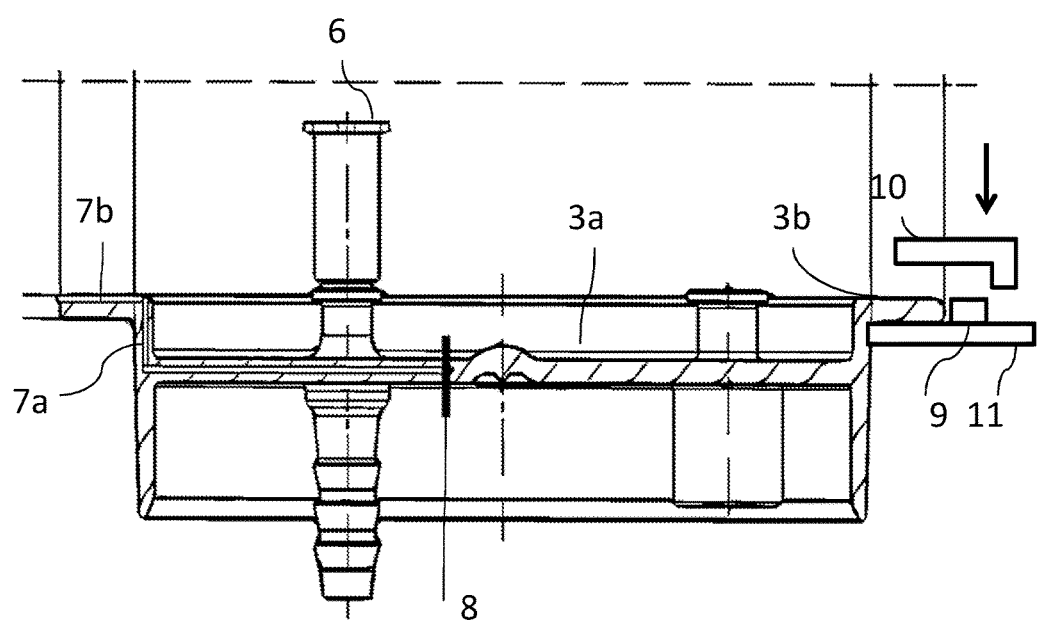
FIG. 3 illustrates a section through the cover in accordance embodiments.

The solution in accordance with embodiments is illustrated in an example from FIGS. 2 and 3.

FIG. 2 illustrates a plan view of a cover 3 having an outer flange region 3b, which forms a rim. In the illustrative embodiment, the inner region 3a of the cover arches towards the rear out of the plane of the drawing. The cover 3 is to close an opening in a fuel tank, e.g., a service opening for a fuel pump or some other electric built-in component. In this illustrative embodiment, the cover has openings 6, which are provided, for example, for a fuel line.

A plug connector 5 is indicated in the lower region of the cover 3. The plug connector 5 has a plurality of pins. Via the plug connector 5, the electric built-in component is supplied with electric energy. A grounding strip 7, which extends from the ground pin 8 to the flange of the outer flange region 3b, is depicted in dashed lines. Here, the shape illustrated, by way of example, is curved or kinked, but a straight line connection between the ground pin 8 and the outer flange region 3b may also be advantageous.

FIG. 3 illustrates the cover 3 with the inner flange region 3a and the outer flange region 3b. The section furthermore illustrates a terminal, which is mounted in one of the openings 6. The ground pin 8 extends from the upper side of the inner region 3a at least as far as the grounding strip. The grounding strip 7 is overmoulded within the plastic layer of the inner region 3a. It extends from the ground pin 8 to the rim of the cover 3. There, it follows the design, which in this case is step-shaped, and extends upwards in the plastic and emerges at the surface in region 7b. In region 7b, the grounding strip 7 is overmoulded only on one side as it extends over the surface of the flange region 3b. This results in the grounding strip 7 extending over its entire extent in a region 7a in which it is overmoulded on both sides and is mounted on the surface only in the region of the outer flange region 3b, in which it needs to come into contact with the closure part.

The installation of the cover 3 in the fuel tank 1 is further indicated in FIG. 3. The container 11 of the fuel tank 1 has a receptacle 9. This receptacle 9 may either be impressed in the material or applied in some other way, e.g., by being welded on. The cover 3 rests against the receptacle 9, and is connected to the container 11 by way of a suitable receiving ring 10. It is possible here to use a screwed receiving ring 10 or to configure the receptacle 9 and the receiving ring 10 in such a way that a snap joint can be produced.

By way of the receiving ring 10, which may be composed of a metallic material, at least on the inside thereof, the ground connection between the grounding strip 7, which extends along the surface of the outer flange region 3b, and the container 11 of the fuel tank is established. In accordance with embodiments, a metal grounding strip 7 may be used, and placed in the injection mould and overmoulded in the production of the cover 3. During this process, two different regions are produced: a region 7a overmoulded on both sides and a region 7b overmoulded on one side. An alternative solution is a two-component production of the cover 3. In this process, a conductive region composed of a conductive plastic may be injected onto a first plastic component, which serves as an insulator, and the conductive region, in turn, is covered by an insulating plastic.

The ground pin 8 illustrated in FIG. 3 can be part of a plug connector. In the simplest case, the plug connector 5 may be used to supply energy to an electric built-in component. The plug connector 5 is not depicted in FIG. 3. It is also not absolutely essential for the implementation of embodiments. It would also be possible to configure embodiments in such a way that a ground pin is connected to the vehicle by a separate ground lead and is not used in combination with an electric lead. It is also not essential that the fuel tank 1 should be composed completely of a metallic material. It is also possible to use a fuel tank 1 partially comprising plastic.

The embodiment has been described with reference to a fuel tank 1 but can be applied to any tank that requires grounding.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 fuel tank
2 fuel pump
3 cover
3a inner region
3b flange region
4 opening
5 plug connector
6 opening
7 grounding strip
7a grounding strip region (overmoulded on both sides)
7b grounding strip region (overmoulded on one side)
8 ground pin
9 receptacle
10 receiving ring
11 container
16 pump housing
18 control unit

What is claimed is:

1. A vehicle fuel tank comprising:
a container composed at least partially of a conductive material so as to be electrically conductive, and which forms a tank wall;
a fuel pump arranged in the container;
a cover, composed of a plastic material, to close an opening formed in the container for the fuel pump, the cover including an inner flange region, with at least one plug connection having a ground pin, and an outer flange region;
a grounding strip, integrally arranged into the cover so as to be covered on both sides thereof at the inner flange region, and to be covered on one side thereof at the outer flange region so as to expose an opposite side thereof, the grounding strip to connect the ground pin to at least one conductive region of the container; and a receiving ring to establish a ground connection between the grounding strip and the container.

2. The vehicle fuel tank of claim 1, wherein the grounding strip is formed into the cover.

3. The vehicle fuel tank of claim 1, wherein the grounding strip is composed of a conductive plastic material.

4. The vehicle fuel tank of claim 1, wherein the receiving ring is composed of a metallic material.

5. The tank of claim 1, wherein the receiving ring, at least on an inside thereof, is composed of a metallic material.

6. A fuel tank comprising:

a container which is at least partially electrically conductive and which has an opening;

a fuel pump arranged in the container;

a cover, composed of a plastic material, to close an opening formed in a section of the tank for the fuel pump, the cover including an outer flange region and an inner flange region having a ground pin;

a grounding strip, integrally arranged into the cover, to connect the ground pin to at least one conductive region of the container, the grounding strip extending along a surface of the outer flange region; and a receiving ring to connect the cover to the container and establish a ground connection between the grounding strip and the container, wherein the grounding strip is moulded into the cover such that:

at the inner flange region, both sides of the grounding strip are moulded into the cover, and at the outer flange region, one side of the grounding strip is moulded into the cover so as to expose an opposite side thereof.

* * * * *